United States Patent [19]

Sandman et al.

[11] Patent Number: 4,811,211
[45] Date of Patent: Mar. 7, 1989

[54] ON-LINE OVERFLOW RESPONSE SYSTEM AND ALU BRANCHING STRUCTURE

[75] Inventors: Leonardo Sandman; Yeshayahu Mor, both of Cupertino, Calif.; Yeshayahu Schatzberger, Haifa, Israel

[73] Assignee: Performance Semiconductor Corporation, Sunnyvale, Calif.

[21] Appl. No.: 913,055

[22] Filed: Sep. 26, 1986

[51] Int. Cl.$^4$ ............................................. G06F 11/00
[52] U.S. Cl. ............................................. 364/200
[58] Field of Search ... 364/200 MS File, 900 MS File

[56] References Cited

U.S. PATENT DOCUMENTS

| | | | |
|---|---|---|---|
| 4,021,655 | 5/1977 | Healey et al. | 364/200 |
| 4,161,031 | 7/1979 | Olander, Jr. et al. | 364/200 |
| 4,251,860 | 2/1981 | Mitchell et al. | 364/200 |
| 4,334,307 | 6/1982 | Bourgeois et al. | 364/200 |
| 4,338,675 | 7/1982 | Palmer et al. | 364/200 |
| 4,349,873 | 9/1982 | Gunter et al. | 364/200 |
| 4,386,400 | 5/1983 | Cope et al. | 364/200 |
| 4,651,276 | 3/1987 | Vahlstrom et al. | 364/200 |

OTHER PUBLICATIONS

Mano, M. M., Computer System Architecture, N.J., Prentice-Hall, 1985, pp. 140–142, 159–161.

Primary Examiner—Gareth D. Shaw
Assistant Examiner—Joseph T. Fitzgerald
Attorney, Agent, or Firm—Alan H. MacPherson; Paul J. Winters; Brian D. Ogonowsky

[57] ABSTRACT

A computer is sped up by reducing significantly the time necessary for the computer to detect and respond to an overflow following an ALU operation of a type which generates an overflow. This is done by assuring the next instruction in sequence is the one to be executed and in parallel detecting the occurrence of an overflow as the result of an implementation of a selected instruction and then producing a flag in response to the overflow. The flag is detected, and selected portions of the computer are disabled to inhibit any change in state within the computer following the generation of the overflow. An interrrupt sequence is then implemented to correct the output of the instruction which generated the overflow to compensate for the overflow. The next following instruction is then implemented after completion of the interrupt routine. Consequently, a delay following each instruction of a type which can generate an overflow is avoided unless an overflow condition actually exists because should an overflow not exist the computer automatically implements the next correct following instruction. In an alternative embodiment, an ALU operation capable of producing a branch signal is followed by the most likely microinstruction to occur. Should, however, the ALU operation indicate a branch, selected components of the computer are disabled to inhibit any change in state within the computer following the generation of the branch signal. An alternative microinstruction is then implemented in response to the branch signal. A selected sequence of microinstructions is then implemented following the completion of the alternative microinstruction. Consequently, a delay following each instruction of a type which can generate a branch is avoided unless a branch signal actually is generated.

12 Claims, 9 Drawing Sheets

ON-LINE OVERFLOW RESPONSE SYSTEM AND ALU BRANCHING STRUCTURE

BACKGROUND OF THE INVENTION

1. Field of the Invention

This invention relates to a method of increasing the speed with which a computer checks for and handles numbers which are larger in size than the normal range of numbers usually handled by the machine and to a related method of increasing the speed with which a computer does conditional ALU branches.

2. Description of the Prior Art

A number of ways have developed in the past to deal with the situation which arises in a computer when the result of a computation yields a number which is outside the size of the numbers normally handled by the computer. Typically, the user's software tests for an overflow bit (such as a binary "1") resulting from a previous calculation and when such a bit is present implements a software routine to handle the overflow. This method is relatively complicated in that the software must check each calculation to see if the resulting number is larger in size than the numbers usually handled by the computer. The computer can then deal with the resulting number accordingly. Naturally, the software to implement these routines takes time to be executed and thus slows the computer.

Another alternative for dealing with this situation is, for example, to provide in the computer an additional higher position register or range which will handle that portion of a number beyond the normal first range of numbers handled by the machine.

A third alternative is to take the largest number within the range capable of being handled by the machine and treat this as the result of the operation.

These above alternatives are software implemented and thereby time consuming.

A fourth alternative utilizes a "delay to check overflow" included in each user instruction of a type which could generate an overflow.

In implementing these routines, it is customary to test each number generated by a calculation to determine that it is in the range of numbers capable of being operated on by the machine. Following the execution of an arithmetic instruction, the machine will then make a decision as to whether the result is correct or an "overflow" has occurred. Thus, a penalty is incurred in computational speed by the time necessary to carry out these tests whether or not an overflow occurs.

A computer is also slowed as a result of certain ALU operations which are followed by one of two different possible microinstructions where the particular next microinstruction selected depends on the results of the current microinstruction. Generally, additional time is required to test the results of the current ALU operation and then select the proper microinstruction to branch to for the next operation. This also slows the computer.

SUMMARY OF THE INVENTION

This invention overcomes the penalty in time associated with checking for an overflow following each arithmetic instruction and with checking after certain ALU operations (very often belonging to critical microcode algorithms) to determine where to branch.

In accordance with our invention, the speed of computation of a computer is substantially increased by testing for an overflow condition following completion of a user instruction simultaneously with the implementation of the next user instruction, aborting the implementation of the next user instruction in response to an overflow condition and then implementing an interrupt sequence to handle the overflow. More specifically, in one embodiment, a signal, typically called a "flag", is provided by the arithmetic logic unit ("ALU") to indicate that a particular result being obtained has an overflow. The detection of an overflow is done simply in a well-known manner. Whenever an overflow occurs, usually (but not necessarily) near the end of the execution of the particular instruction, a signal (i.e., a flag) is produced which is latched on the end of the instruction to indicate that an overflow has occurred. This signal is detected in much less than one clock cycle of the machine and all strobes and active signals which are normally supposed to affect the status of the internal machine for the following user instruction are inhibited. Should the signal indicate that no overflow has occurred, the normal changes in the state of the machine to implement the next following instruction are not inhibited and the machine continues to execute the next following user instruction, whatever it might be.

The presence of an overflow signal means that the next following user instruction is wrong because its implementation assumes that no overflow signal has been received when in fact an actual overflow has occurred. Accordingly, the next following user instruction must be neutralized and not executed and a different routine must be implemented. This is done in accordance with our invention by inhibiting promptly after the start of the next following user instruction and after the detection of the overflow signal all signals which would change the state of the machine.

In accordance with one embodiment of our invention, this is done by sending an inhibiting signal to the timing generator unit controlling the implementation of the different states of the machine in response to the next following instruction.

In addition, in accordance with our invention the next following instruction is terminated as soon as possible to limit the unnecessary penalty in time paid when an overflow exists.

Finally, in accordance with our invention, the overflow signal initiates an interrupt routine associated with the start up of the machine. The interrupt produces a standard signal which activates the interrupt sequence of microinstructions and the interrupt hardware of the machine and starts the execution of an interrupt routine. This routine generally utilizes a combination of hardware and software. Once the interrupt routine is initiated, the user of the machine then is able to respond to the overflow through software and the machine is ready to restart normal execution of the aborted instruction after the overflow has been taken care of.

In accordance with our invention, after the interrupt sequence has been executed the machine is automatically set up so that it returns to the execution of the normal program and in particular to the instruction the execution of which was inhibited and aborted because of the overflow. The proper execution of this instruction is assured in accordance with our invention because the overflow signal inhibits the change in state of the machine including the incrementing of the instruction counter. Thus the instruction counter remains pointing to the inhibited instruction during the operation of the interrupt procedure.

A similar approach is taken to handle ALU branch operations. Those ALU operations which are followed by a selected one of two different microinstructions depending on the results of the ALU operation are followed, in accordance with this invention, by the most likely to occur microinstruction. If the results of the preceding ALU operation require a different microinstruction, this is detected before the following microinstruction has been substantially implemented. The system then inhibits the implementation of the following microinstruction and branches to the correct microinstruction. Following execution of the correct microinstruction, the machine will implement additional microinstructions as required by the instructions from the user's program.

This invention will be more fully understood in view of the following detailed description taken together with the accompanying drawings.

DETAILED DESCRIPTION

This invention will be described in conjunction with the product denoted by Performance Semiconductor as the PACE 1750A Microprocessor. However, the principles of this invention are applicable in other computers and thus the specific description contained herein is not intended to limit the applicability of the invention.

In understanding this invention, it is useful to define certain terms.

A "user instruction" defines one of the set of instructions capable of being called for by a user to be carried out on the machine.

A "microinstruction" is one line of microcode. A microinstruction is executed in what is called one microcycle. In accordance with the timing signals which actually drive the execution of the machine, one microcycle is executed in three or more clock cycles such as A0, A1, and A2. At the start of one microcycle certain specific things will happen depending upon the type of machine.

A "state" represents the condition of the machine at a specified time during or at the end of one clock cycle.

A "microstate" is the structure of the machine as a consequence of a clock cycle and the previous state of the machine.

Figure 7A:
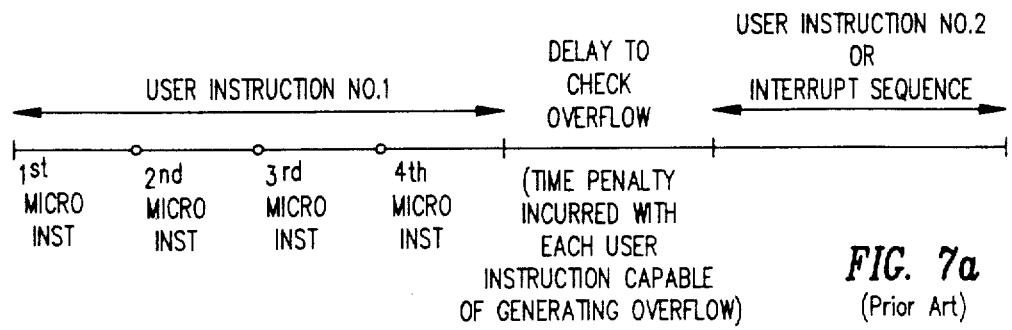
FIGS. 7a and 7b illustrate graphically a prior art method of handling overflow and a method used by this invention to handle overflow, respectively.

FIG. 7a illustrates the method for detecting overflow in the prior art. Each user instruction, denoted in FIG. 7a as user instruction No. 1, of a type which could generate an overflow (such as an arithmetic operation) is followed by a "delay to check overflow" prior to the implementation of the next user instruction. This delay allows the machine to check to see if an overflow exists. Should an overflow exist, an interrupt microroutine is triggered at the end of the "delay to check overflow" to handle the overflow. The interrupt microroutine might take as many as 300 clock cycles. Naturally, should a user instruction not result in an overflow, user instruction No. 2 would be implemented but the time taken by the "delay to check overflow" would still be required. This slows down the computer significantly.

Figure 7B:
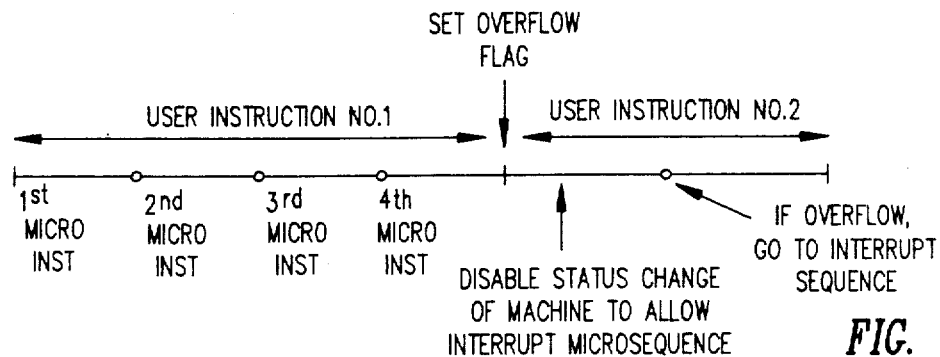

FIG. 7b illustrates the method of operation of this invention wherein the "delay to check overflow" is eliminated and thus the computational speed of the computer is significantly increased. In FIG. 7b, user instruction No. 1 is again assumed to be a type of instruction which can generate an overflow. As shown in FIG. 7b, user instruction No. 1 is implemented in four microcoded microinstructions. (Typically, each microinstruction is implemented in a minimum of three CPU clock cycles.) At the end of the fourth microinstruction, and not before, an overflow flag is set if an overflow results from implementation of user instruction No. 1. This overflow flag is set in nanoseconds, which is very rapid compared to the clock period, to inhibit any change in status of the machine and to allow an interrupt microsequence to be implemented to handle the overflow. However, should the overflow flag not be set, user instruction No. 2, which has already been called to be implemented by the machine immediately following the completion of user instruction No. 1, will continue to be implemented. Thus by use of hardware of a type to be described, the "delay to check overflow" required in the prior art is eliminated and the overall speed of operation of the machine is materially increased because in most calculations no overflow occurs.

It is apparent from FIG. 7a that the time penalty labeled "Delay To Check Overflow" is incurred with each user instruction which is capable of generating an overflow signal whether or not that instruction does in a particular situation actually generate such an overflow. In FIG. 7b, however, no time penalty is incurred when no overflow occurs because user instruction No. 2 has begun to be implemented immediately following the end of user instruction No. 1. However, should an overflow flag be set as a result of the calculation carried out by user instruction No. 1, then a disable status signal is generated in the first portion of the first microinstruction of user instruction No. 2. This status signal prevents the status of the machine from changing. Moreover, at the end of the first microinstruction of user instruction No. 2, the machine goes to an interrupt microsequence if the overflow flag had been set at the end of user instruction No. 1. Thus, only in the exceptional case when an overflow occurs and the system must go to an interrupt microsequence does the machine incur a penalty of one microinstruction. This penalty typically corresponds to three clocks in the PACE 1750A microprocessor.

Figure 1:
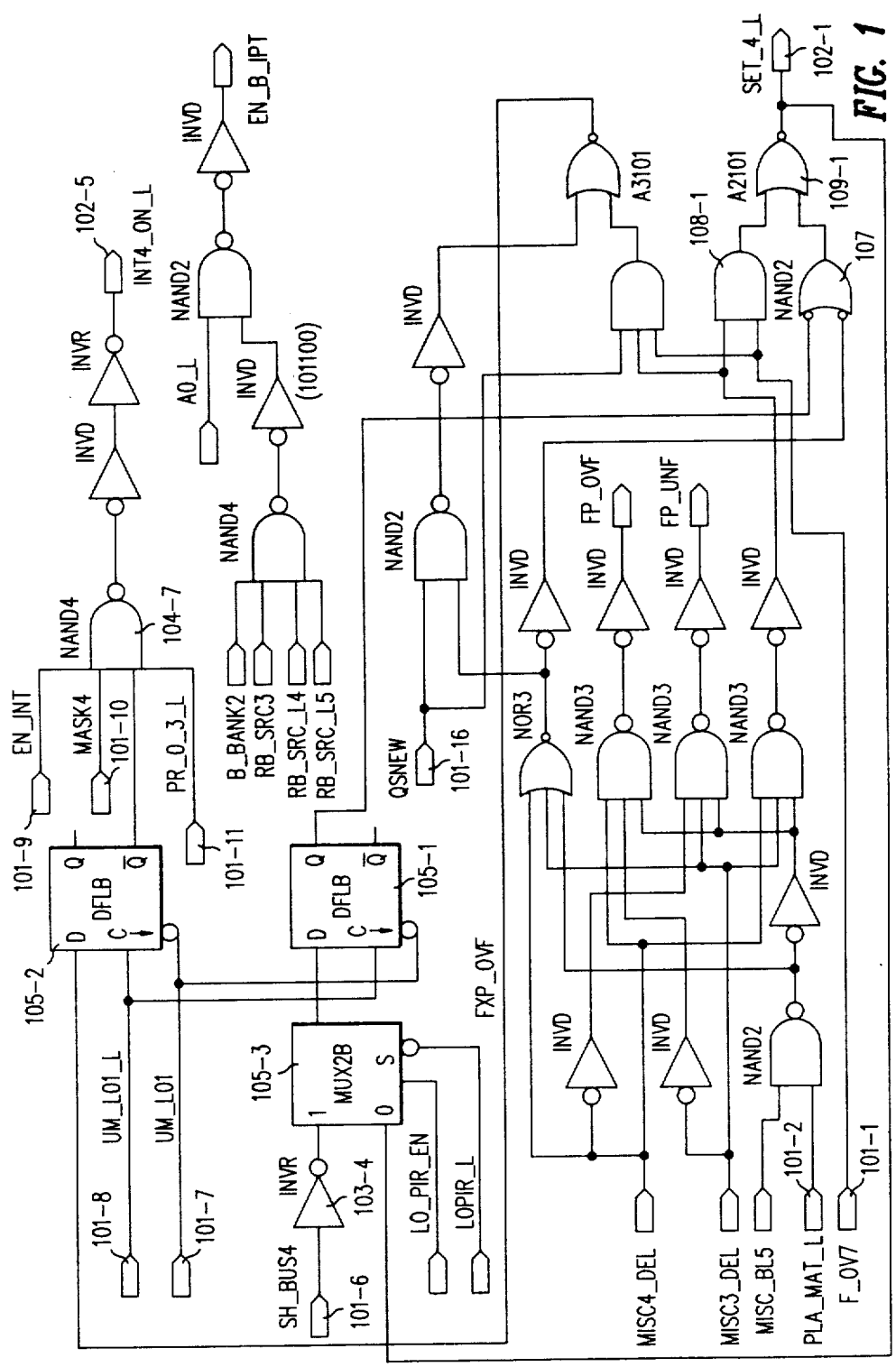
FIGS. 1-6 illustrate circuitry used in one computer to implement the method and structure of this invention.

Referring now to FIG. 1, specific devices in that figure utilized in the invention have been identified by numbers.

The structure in FIG. 1 delivers two output signals to the computer. One output signal is identified on output lead 102-1 and is called "SET 4 LOW" and the other output signal is identified on output lead 102-5 and is called "INTERRUPT 4 ON LOW" or "INT4 ON L". The "SET 4 LOW" signal activates the interrupt portion of the computer which consists of both hardware and microcode and the "INT 4 ON LOW" identifies each overflow as occurring on the last microinstruction of a user instruction. When an overflow occurs, the INT 4 ON LOW signal then is transmitted to various parts of the machine to disable the machine and prevent the machine from executing the next but wrong instruction following the occurrence of the overflow.

In the PACE 1750A microprocessor there are sixteen interrupts. All but two interrupts are disabled by a signal known as "INTERRUPT DISABLE" applied to one of the four input leads (101-9, 101-10,101-11 and $\overline{Q}$ output lead from flip-flop 105-2) to NAND gate 104-7. The signal on input terminal 101-9 known as EN-INT, which is shorthand for "enable interrupt", comprises the INTERRUPT DISABLE signal and disables all sixteen interrupts when low. The MASK 4 signal applied to input terminal 101-10 masks out the interrupt No. 4 in a manner specified by the MIL-STD-1750A (USAF) published 21 May, 1982, which defines the 1750A instruction set and which is hereby incorporated by reference. On input terminal 101-11, a priority signal known as PR 0 3 L is provided which reflects the fact that interrupt No. 4 can be implemented only if no other higher priority interrupts (i.e., interrupts 0-3) are pending. Interrupts 0-3 have a higher priority than the overflow interrupt to be generated by an arithmetic calculation and to be dealt with by this invention. The fourth input to NAND gate 104-7 is provided from the $\overline{Q}$ output lead from flip-flop 105-2 which latches the overflow detection signal to provide a high level signal on the fourth input lead to NAND gate 104-7. Under normal circumstances, overflows are not expected as the result of an arithmetic calculation. However, in the rare case when an overflow is obtained, the output signal on the $\overline{Q}$ output lead of flip-flop 105-2 goes to a high level.

F OV7 on input lead 101-1 is a flag signal from the ALU which indicates whether or not the execution unit of the machine is producing an overflow signal. When the machine indicates both that an overflow is possible because of the type of user instruction being executed and that an actual overflow exists, then an output signal from AND gate 108-1 triggers the output signal from NOR gate 109-1 to generate the "SET 4 LOW" signal on terminal 102-1. This SET 4 LOW signal indicates that the interrupt overflow signal should switch on at the end of the microinstruction currently being executed.

The ALU generates the flag signal F OV7, indicating that the current result just being obtained yielded an overflow, using a very well-known algorithm. For example, the result, 32000 plus 32000 which should be a positive number, will eventually receive the format of a negative number in the 2's complement arithmetic used in computers. So, routinely checking the result and knowing that two positive numbers are being added and receiving a negative number tells the machine that the result is incorrect because an overflow occurred. Whenever the ALU delivers an overflow indication, which is done by and close to the end of the execution of the instruction, the signal F OV7 is generated at the end of the instruction and this signal (i.e., flag) is latched in flip-flop 105-1 (FIG. 1) which remembers that an overflow occurred. As soon as this instruction is ended immediately the next-following instruction is begun. According to specific timing signals and states this next-following instruction should do different things in the processor. But existence of the overflow signal F OV7 tells the machine that this instruction is the wrong one because this next following instruction was loaded assuming that no overflow will be received. So the machine must go to a different routine. And the only way to avoid the wrong effects of the next following but wrong instruction is to neutralize it by inhibiting all the signals which could change the state of the machine. This is done by sending the inhibiting signal "INT 4 ON L" to the timing generator unit which actually delivers the basic strobes and pulses for the implementation of the different changes in the machine. Registers are not loaded and the instruction counter is not incremented.

The machine ends the next-following but wrong instruction as soon as possible in order to limit the unnecessary time penalty paid when the overflow exists. The machine then goes into an interrupt routine. To do this, an interrupt signal called "SET 4 LOW" (FIG. 1) is produced which goes into the interrupt block of microsequences and hardware of the machine and starts the execution of the interrupt routine. Once the machine goes into the interrupt routine, the user, through the software program, takes care of the overflow and the machine will be ready to restart normal execution after the overflow has been taken care of.

The restart after the interrupt routine is executed is completely standard. In any case, with an interrupt, the machine is set up so that by the end of the interrupt routine, the machine goes back to execution of the normal program. In accordance with this invention, the machine goes back to the next correct instruction because as a result of inhibiting any changes in state in the machine, the incrementing of the instruction counter is also inhibited which guarantees that the instruction counter stays pointing to the right instruction (i.e., the next instruction following the instruction which generated the overflow) at the end of the interrupt routine.

So, even though the next instruction sequence has been started, the instruction counter has not been incremented. Indeed, the instruction counter is only incremented on the end of an instruction. The next-following instruction under normal circumstances but the wrong instruction with an overflow, will not increment the instruction counter. This guarantees that when the machine completes the interrupt routine the machine will restart with the same wrong instruction which is now the right instruction, because now it is the turn of this instruction to be executed.

The interrupt routine is implemented partly in microcode, (i.e, the interrupt service routine) and partly in hardware. In addition an interrupt user routine is provided which is a normal software routine. This software routine takes care of the overflow according to the needs or requirements of the software or the program. This routine is utilized after the interrupt is acknowledged and the command is transferred to the user software routine.

Figure 2:
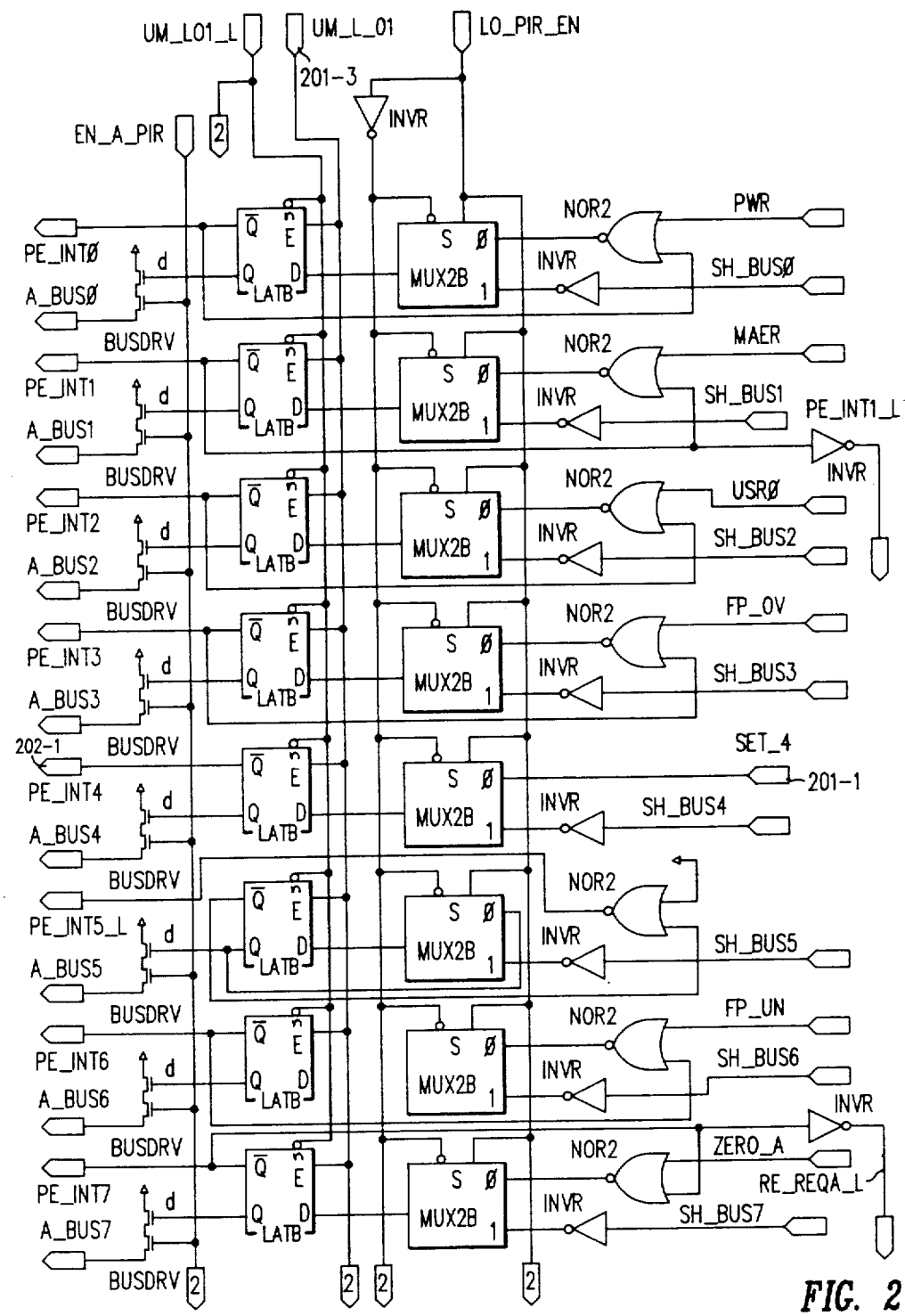

The structure shown in FIG. 1 delivers two output signals to the machine. One is identified on terminals 102-5 called "INTERRUPT 4 ON LOW", and the other one is identified on input terminal 102-1 and is called "SET 4 LOW". SET 4 LOW actually remains in the interrupt area part of which is shown in FIG. 2 and sets the interrupt flag for further processing and the second of which is a flag PE INT4 (terminal 202-1 in FIG. 2).

Referring now to input terminal 101-6, inverter 103-4, and multiplexer 105-3, with the signal SET 4 LOW on terminal 102-1, the interrupt is now appropriately implemented. This is done by multiplexer 105-3 which produces an output signal which generates a high level signal on the D input of flip-flop 105-1. The output signal on the Q output lead from flip-flop 105-1 then provides an input signal to one input lead of OR gate 107. The input signal on the D input lead to flip-flop 105-1 is sampled as with any other flip-flop by a pair of clock signals provided on terminals 101-7 and 101-8 known as UM_L01 and UM_L01_L, respectively.

Flip-flop 105-2 is provided to produce a signal which remembers for one microcycle the fact that the next following microinstruction should be inhibited. The output signal from the $\overline{Q}$ output lead from flip-flop 105-2 is provided to one input lead of NAND gate 104-7 which also receives three additional input signals as described. The occurrence together of all four input signals to NAND gate 104-7 indicates that an exceptional situation exists where the next microinstruction to be carried out should be inhibited.

The fourth condition is represented by the signal on output terminal $\overline{Q}$ of flip-flop 105-2. This signal indicates the presence of the last micro cycle of the instruction which might generate an overflow. In case an overflow is received but is not the last microinstruction in the sequence of microinstructions which implement the current user instruction, there is no problem at all because the machine still has normal time to react and generate an interrupt in time. So this mechanism is only enabled whenever the machine is in the last microinstruction and that is indicated by the signal "QSNEW" brought by connector 101-16. Note that the operation of the next user instruction is disabled only when the overflow occurs in the last word of the preceding microinstruction sequence.

In FIG. 2 are shown the incoming signal on connector 201-1 called "SET 4 L" and the outgoing signal on connector 202-1 called "PEINT4". The output signal called PEINT4 is generated on reception of the interrupt produced by the incoming signal "SET 4 L" and the sampling signal representing unmasked load on terminal 201-3. FIG. 2 shows the pending interrupt register. Each input on FIG. 2 represents a different interrupt. The first one is power down, the second one is machine error, the third one is user interrupt 0, and the fourth one is floating point overflow. The fifth interrupt is SET 4 L. The remaining interrupts are as defined in the specification for the 1750A instruction set referred to above.

FIG. 2 also shows the ENABLE to the A bus which is labeled EN A PIR which means enable pending interrupt register to the A bus as well as illustrates the bus drivers to the A bus. The A bus has 16 channels all of which are enabled simultaneously by EN A PIR.

Figures 3, 3A:
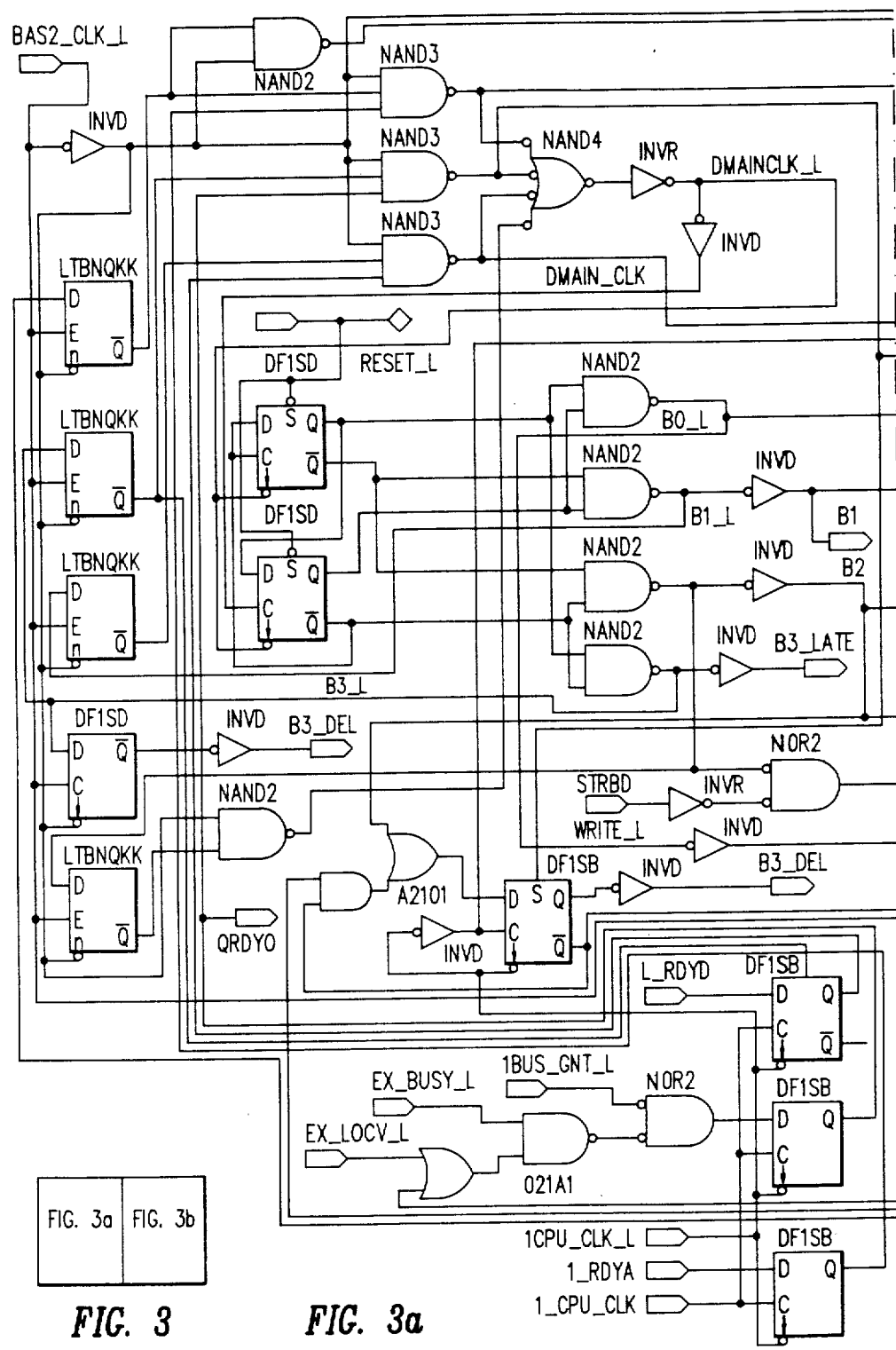
Figure 3B:
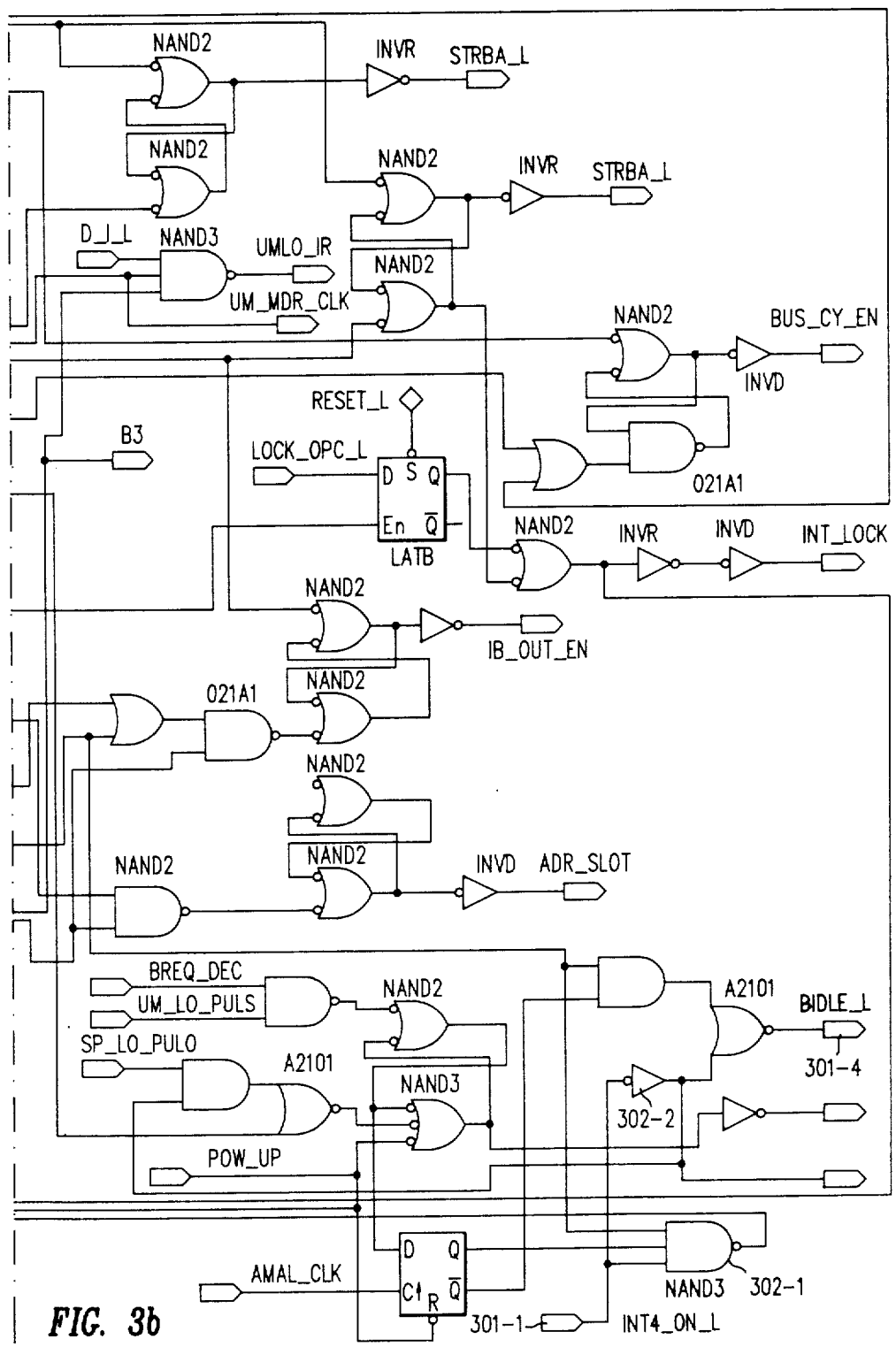
Figures 4, 4A:
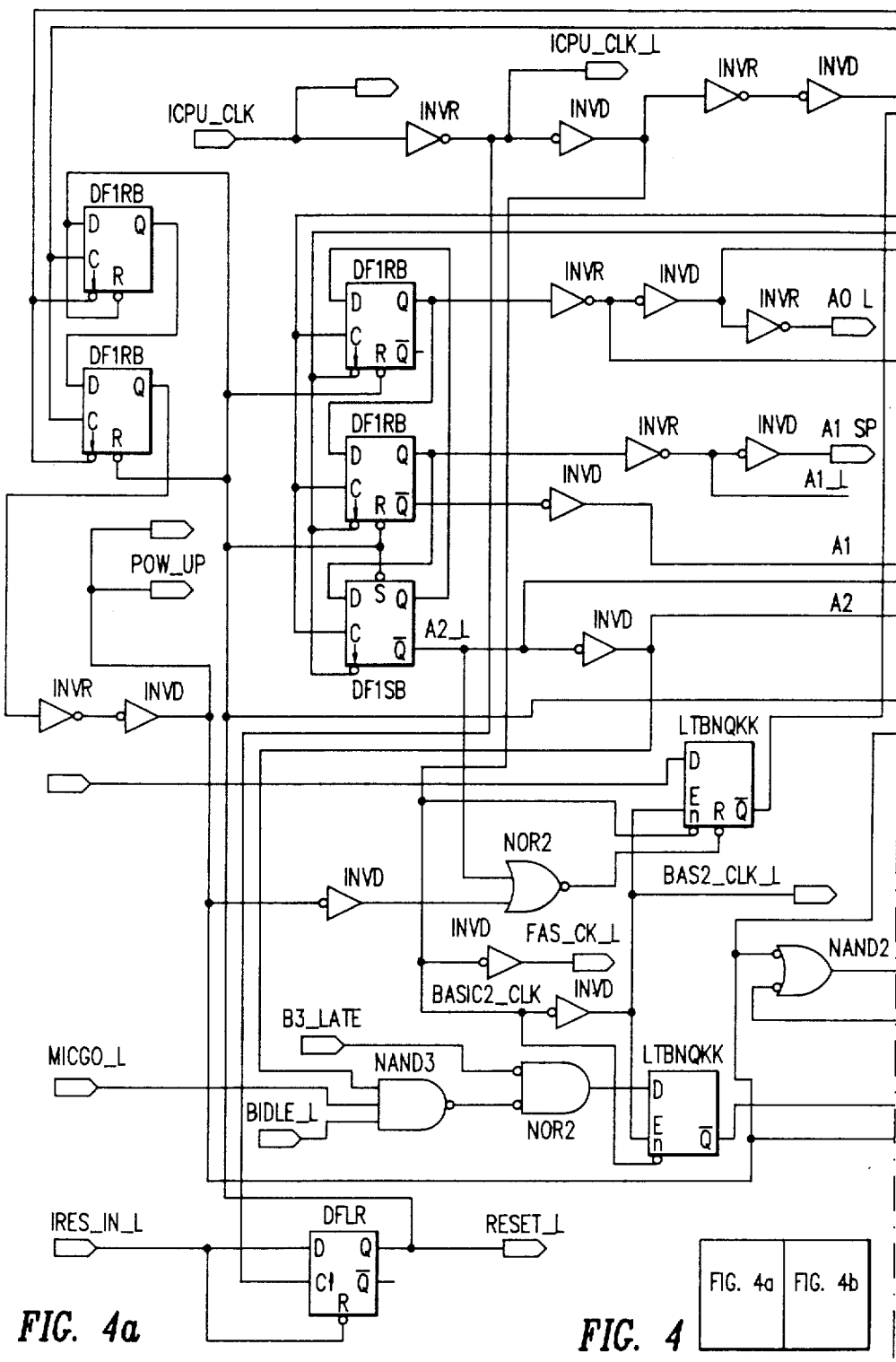
Figure 4B:
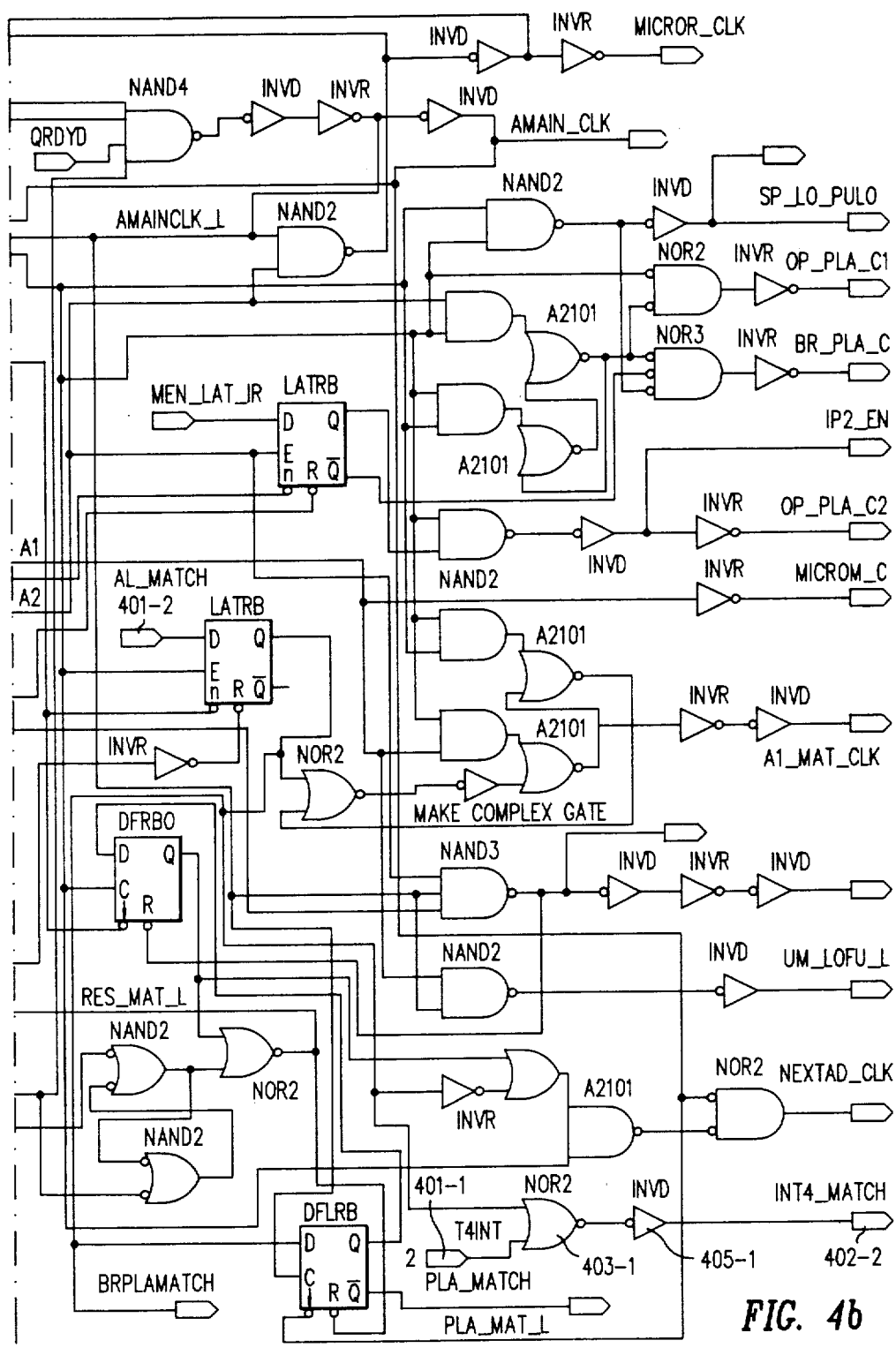

FIGS. 3 and 4 illustrate part of the timing unit receiving the inhibiting signal "INT 4 ON LOW". In FIG. 3 INT 4 ON LOW which is supplied on terminal 301-1 produces two things. This signal actually disables the signal called BIDLE on connector 301-4.

Signal BIDLE LOW actually is related to the start of a new bus cycle which should not be started whenever the so-called current instruction appears to be the wrong instruction because the interrupt was received. So interrupt 4 is here to disable the start of the bus operation. Gate 302-1 is actually supposed to start a bus operation whenever the system must wait for acknowledgment from the bus. This signal INT 4 ON LOW on the gate 302-1 actually disables the gate from waiting for an acknowledgment from the bus which is not likely to come because it was disabled sooner by B IDLE LOW on connector 301-4 caused by inverter 302-2 by the same signal INT 4 ON L.

In FIG. 4 referring to gate 403-1 and inverter 405-1, these two gates are combining two different signals. One is PLA MATCH on connector 401-1 and another is the signal shown in FIG. 4 as AL MATCH on terminal 401-2. Both signals are merged together by NOR gate 403-1 to create the INT 4 MATCH signal. This signal is on connector 402-2. This signal being on or true, indicates one of two things, either an interrupt 4 situation which should inhibit the bus in the remainder of the machine or a match situation which means an ALU branch should be taken, as described above. Either situation means the inhibit of most of the machine.

Figure 5:
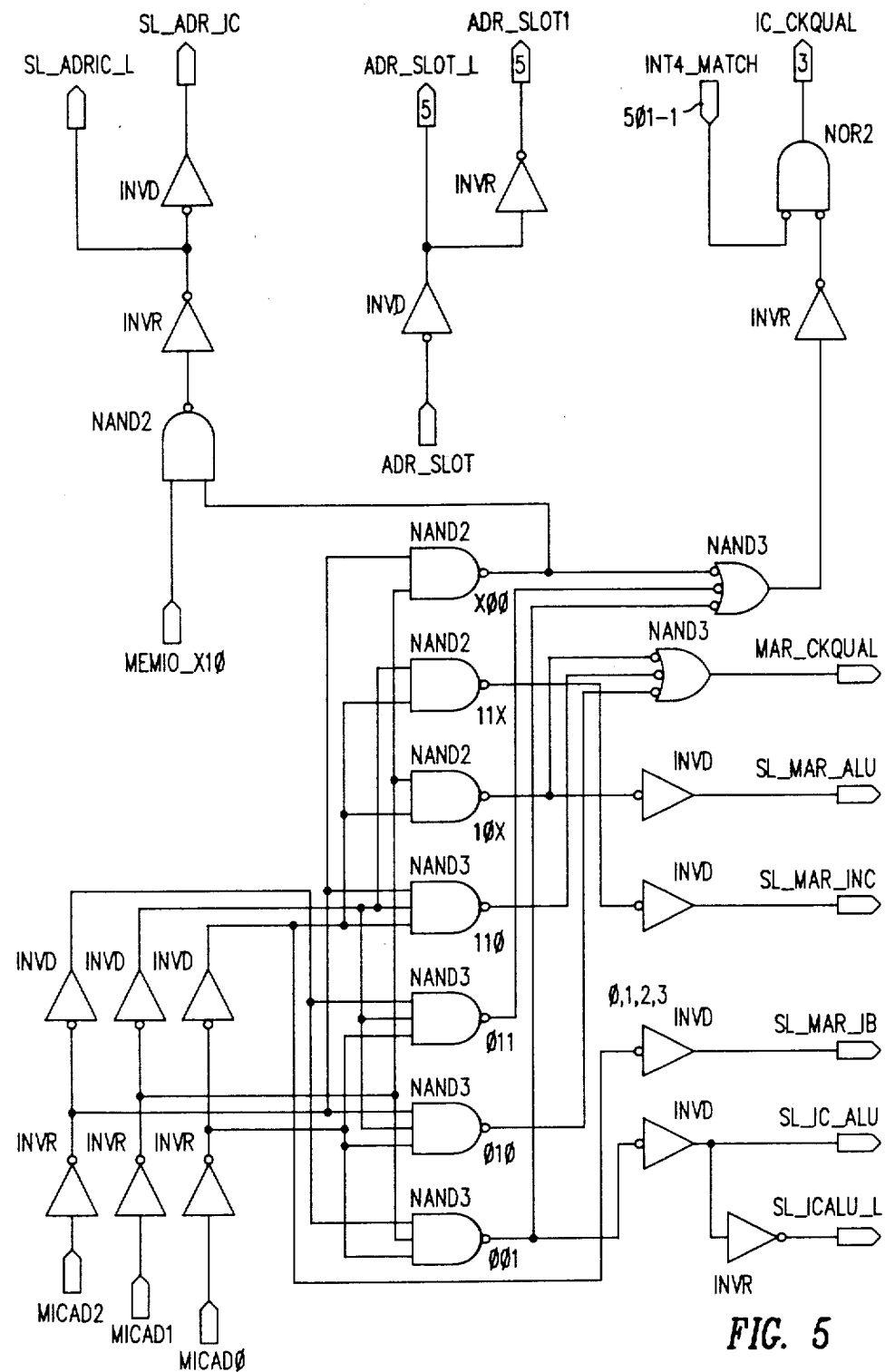

FIG. 5, which is actually part of the machine logic, shows one example of how one important signal is inhibited by the occurrence of the previous interrupt 4 on overflow. In this case the signal IC CK QUAL, if high, allows the increment of the instruction counter, and if low prevents the increment of the instruction counter. This should occur by the end of the so-called current instruction which appears to be the wrong one. This increment is inhibited by INT 4 MATCH coming through terminal 501-1.

Figure 6:
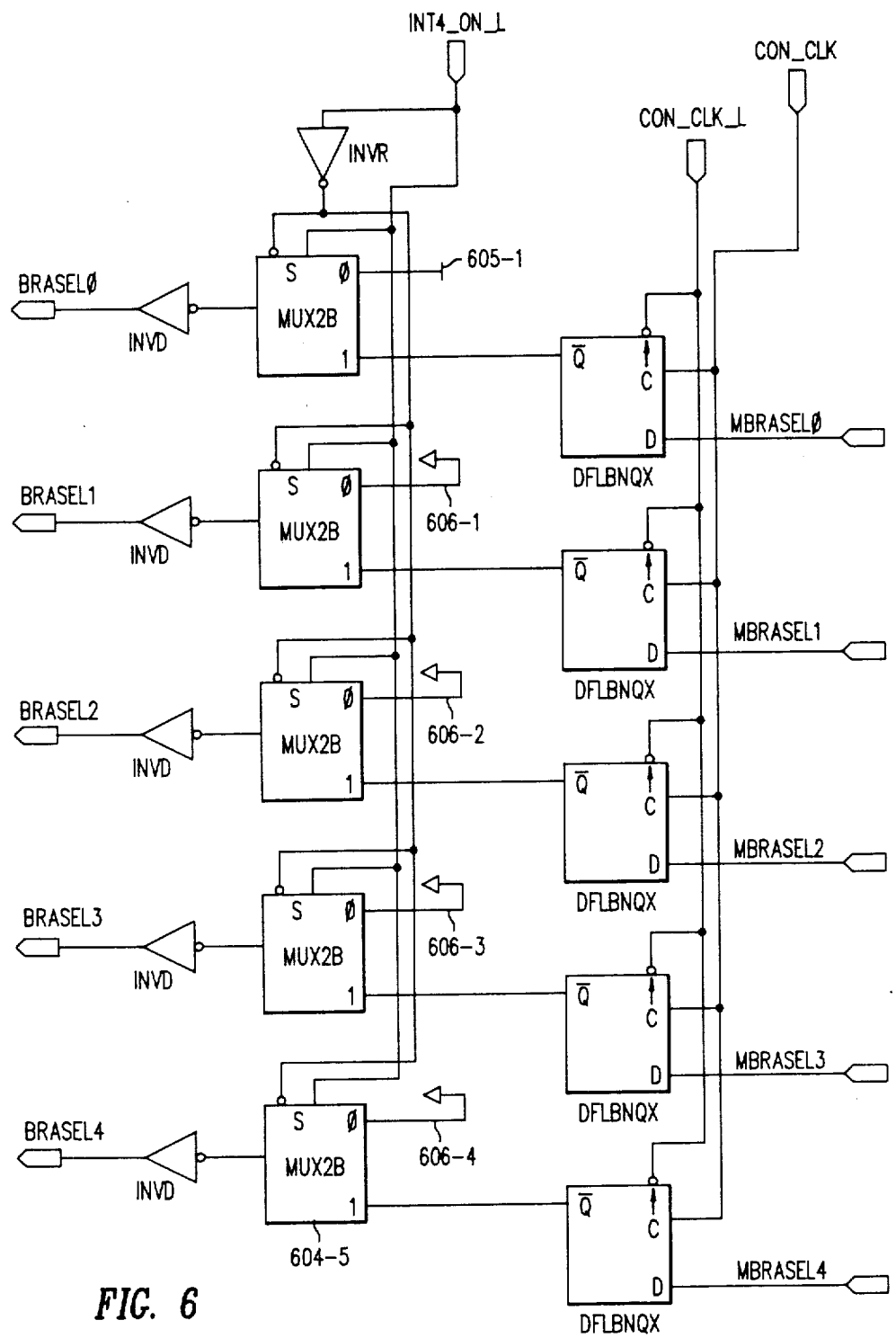

FIG. 6 shows another example of how the occurrence of signal INT 4 ON L actually causes a change in the so-called normal flow of the so-called wrong instruction causing an early exit from this wrong instruction. This instruction could be any one of a number of instructions, but once it is decided that this is the wrong one, any unnecessary penalty in time should be avoided by avoiding the continuation of this instruction as soon as possible. "As soon as possible" means actually after the first microcycle of the instruction and this is done by overriding any possible command from the branch select register with an exit code. This means that for the rest of the machine this wrong instruction is already over. The machine then processes the interrupt. This multiplexer overrides any existing code on the branch select register by imposing an exit code which is 10000 as shown by lead 605-1 connected to Vcc and by leads 606-1–606-4 connected to ground.

Figure 8:
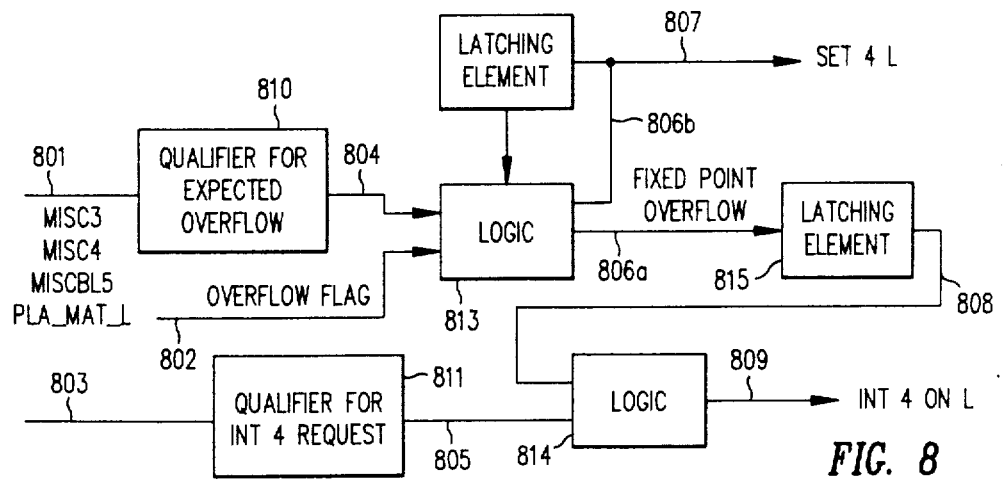
FIG. 8 illustrates in block diagram form the structure and method of one embodiment of this invention.

FIG. 8 illustrates in schematic block diagram form one structure for implementing this invention in the PACE 1750A microprocessor.

Input leads 801 comprise four leads on which are transmitted a set of signals which indicate that the current microinstruction is expecting a possible overflow. These four signals are sent to a piece or logic called a "Qualifier for Expected Overflow" (qualifer 810) which produces on lead 804 an output signal which means "yes, an overflow is expected" or "no, an overflow is not expected". The input signals denoted as MISC 3, MISC 4 and MISC 5 originate in the current microinstruction. Each microinstruction in the PACE 1750A contains fifty-seven bits. One field of five bits in each microinstruction is called the miscellaneous field and can specify up to thirty-two different conditions. One of these conditions is overflow. The five bits are divided into three bits which specify eight blocks and two bits which specify four combinations of each block. The input signals MISC 3, MISC 4, and MISC BL5 represent four different types of overflow (i.e., overflows caused by four different mechanisms in the machine) but only one of the types of overflow is of interest for this particular invention. Thus Qualifier 810 actually is a decoder for one of the four possible types of overflow. The other three types of overflow are handled in the computer in normal ways not related to this invention and have no influence on the expected fixed point overflow which is the subject of this invention. The expected status of the named input signals to Qualifier 810 for this fixed point overflow are MISC 3=1, MISC 4=1, MISC BL 5=1 and PLA MAT L=1. PLA MAT L is an inhibit signal which actually inhibits the whole process described above from happening. The necessity for this inhibit arises from a process called ALU branch logic which will now be described.

Figure 9:
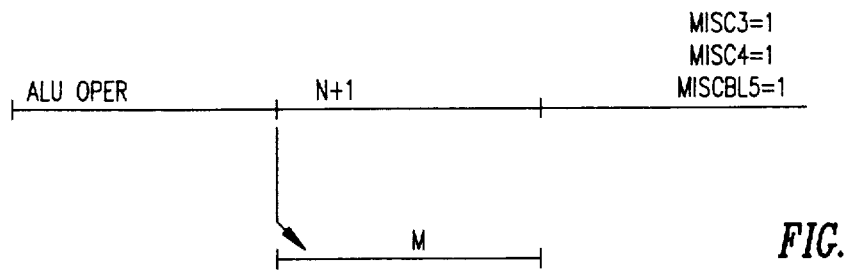
FIG. 9 illustrates an ALU branch method in accordance with another embodiment of this invention.

The ALU branch is illustrated in FIG. 9 and it occurs in a situation wherein a sequence of microinstructions, the execution of a microinstruction depends upon a previous result of a previous microinstruction. But the problem is that the result of the previous microinstruction is well-known only by the end of the said microinstruction and this is absolutely too late to decide where to go in this case. So the assumption is made that the most normal or current situation is taken and then the sequences will be fine and in case the exceptional situation turns out to occur then the problem is fixed by just inhibiting any significant process taking place in this microinstruction. In FIG. 9 the current microinstruction is named the ALU operation and the next microinstruction which should be inhibited because it is the wrong one in the exceptional case is named the N+1 microinstruction. In this case, in the exceptional situation, the correct microinstruction to be executed after ALU operation is the microinstruction named M. This microinstruction can be any one of a number of microinstructions.

Following this M microinstruction, any sequence is possible and the machine would not necessarily come back to microinstruction N+1. The machine just has to finish the current user instruction in the way that the algorithm is defined. To indicate that the next microinstruction N+1 is not the proper microinstruction and to inhibit the implementation of this microinstruction while the machine branches to the M microinstruction, the following happens. At the end of ALU operation, using an ALU operation microinstruction, some ALU flags like overflow flag, 0 flag and others not important to this invention are set. A signal called PLA MAT on input lead 101-2 (FIG. 1) is then defined as 0 or 1. A match indicated by a high level signal on terminal 101-1 (i.e., the signal PLA MAT=1) means that the next microinstruction to be executed, namely N+1, is the wrong microinstruction so it will be disabled (i.e., inhibited). One of the things to be disabled in case a microinstruction is the wrong one (in addition to all the significant strobes described) is the possible start of an INTERRUPT 4 sequence as described previously. In order to make sure that the execution of the wrong microinstruction N+1 will not start the INTERRUPT 4 sequence, the implementation of the INTERRUPT 4 sequence must be inhibited by means of a signal PLA MAT=0 which is merely the inverted version of the previously mentioned PLA MAT=1. When the signal PLA MAT equals zero the machine is in the process of executing a wrong instruction. As a result of this, the starting of an INTERRUPT 4 sequence should be disabled.

Block 813, in FIG. 8, called "Logic" actually combines the output signal from Qualifier 810 on lead 804 with the overflow flag on lead 802. Whenever a high level ("true") signal is achieved from the combination of these two, then two signals are created. One is SET 4 L which is transmitted on leads 806b and 807 to the remainder of system and the other is FIXED POINT OVERFLOW on lead 806a. The first signal SET 4 L mainly starts the interrupt process according to normal interrupt sequences in the machine. The second signal FIXED POINT OVERFLOW, after passing through latching element 815 will be used in logic 814 with the output signal on lead 805 from Qualifier 811 to create the INTERRUPT 4 ON LOW signal in case this is required.

Qualifier 811 for INTERRUPT 4 receives a group of signals on three input leads designated jointly as 803 and these signals are ENABLE INTERRUPT, MASK 4, and PRIORITY 03 LOW. ENABLE INTERRUPT being high means that an interrupt may be received by the machine. This is true for any interrupt described in the Mil Standard 1750A referred to above and implemented by the machine INTERRUPT 4 dealt with by this invention. The second signal is MASK 4. This is a particular signal also defined in the Mil Standard which can enable or disable this particular INTERRUPT 4. The third signal is PRO 3 L. Whenever this signal is HIGH no other interrupt with higher priority, namely INTERRUPT 0 to INTERRUPT 3, exist so INTERRUPT 4 may have the highest possible priority and the INTERRUPT 4 sequences may be started. When all these three signals occur as described, Qualifier 811 will deliver the signal on lead 805 which enables Logic 814 to respond to the latched fixed point overflow signal (from latching element 815) to start the INTERRUPT 4 ON LOW.

The principles of this invention also apply to ALU branching operations. Many important routines, like floating point operations, require some decision to be made based on results of a current microinstruction, which can lead to a possible change in the normal flow of the routine. These decisions consist of whether to execute the next sequential microinstructions or in an exceptional case (like zero operand or exponent overflow, for example) branch to another location in the microprogram. Because of the nature of the pipelined architecture, preparation of the next microinstruction to be executed should start very close to the beginning of the execution of the current microinstruction. Postponing the decision as to which microinstruction to execute next until the result of the current microinstruction is known, require almost one complete additional microcycle to be added to any normal microcycle. In most cases, the normal and expected flow of microinstructions will be required. Indeed, a change in the flow of microinstructions has a very low probability. Furthermore, when an exception from normal occurs, very often the normal operation may be skipped in its entirety so that any time penalty paid in the process of taking the decision, will be offset in the end. As a consequence, in accordance with this invention the normal flow of microinstructions is assumed and no penalty whatsoever is paid in normal cases. On exceptions, a mechanism is provided so that the wrong microinstruction loaded is neutralized by aborting any significant signals relating to this microinstruction before this microinstruction is started. No signal from the implementation of this microinstruction starts before a predetermined interval, thus allowing time for the aborting signal to propagate through the logic. In parallel with the aborted cycle, the correct microinstruction is prepared to be executed in the next microcycle. In summary, any of the ALU branch microinstructions will execute normally in three (3) microstates (one microcycle) and only in exceptional cases will require six (6) microstates (two microcycles).

Other embodiments of this invention will be obvious in view of the above.

We claim:

1. Structure for use in a computer comprising:
   means for detecting the occurrence of an overflow as the result of an arithmetic operation directed by a first instruction, and for producing a first signal in response thereto;
   means coupled to a receive said first signal and in response thereto for inhibiting implementation of a next instruction, already begun but not yet executed, following said first instruction thereby inhibiting any change in state within said computer following the generation of said overflow, whereby said next instruction is not inhibited if said first signal is not received;
   means coupled to receive said first signal and in response thereto for implemention an interrupt sequence following the generation of said overflow, said interrupt sequence allowing for said overflow and providing correct data for manipulation by said next instruction; and
   means coupled to receive a control signal from said means for inhibiting and in response thereto for implementing said next instruction after the complemention of said interrupt sequence, with the effect that
   a delay following each instruction which is capable of a generating an overflow is avoided unless an overflow condition actually exists by the concurrent implementation of the next instruction and detection of the occurence of an overflow.

2. Structure as in claim 1 wherein said first signal is a flag signal to be stored in a register.

3. Structure as in claim 2 wherein said means for inhibiting implementation of a next instruction comprises means for preventing a timing signal generated by a timing unit from triggering any changes in state within said computer.

4. Structure as in claim 3 wherein said means for implementing said next instruction after the completion of said interrupt sequence comprises means for enabling an instruction counter which has been disabled by a signal from said means for inhibiting in response to said flag signal.

5. Structure for use in a computer comprising:
   means for detecting a branch signal generated by an ALU operation indicating the initiation of a branch, and for producing a first signal in response thereto;
   means coupled to receive said first signal and in response thereto for inhibiting implementation of a microinstruction, already begun but not yet executed, following said ALU operation thereby inhibiting any change in state within said computer following the generation of said branch signal, wherein said microinstruction is not inhibited if said first signal is not received;
   means coupled to receive said first signal for implementing an alternative microinstruction following the receipt of said first signal; and
   means coupled to receive a control signal from said means for inhibiting for implementing a selected sequence of microinstruction following the implementation of said alternative microinstruction,
   with the effect that a delay following each microinstruction which is capable of generating a branch is avoided unless a branch condition actually is generated by the concurrent implementation of said microinstruction following said ALU operation and detection of the occurence of a branch signal.

6. Structure as in claim 5 wherein said means for detecting a branch signal generated by an ALU operation indicating the initiation of a branch, and for producing a first signal in response thereto includes:
   means for initiating the implementation of a certain microinstruction following said ALU operation, said certain microinstruction being that microinstruction which is addressed when said ALU operation does not generate a branch signal.

7. The method of handling an overflow in a computer comprising the steps of:
   detecting the occurrence of an overflow as the result of an arithmetic operation directed by a first instruction, and producing a first signal in response thereto;
   inhibiting implementation of a next instruction, already begun but not yet executed, following said first instruction thereby inhibiting any change in state within said computer following the generation of said overflow, whereby said next instruction is not inhibited if said first signal is not received;
   implementing an interrupt sequence following the generation of said overflow, said interrupt sequence allowing for said overflow and providing correct data for manipulation by said next instruction; and
   implementing said next instruction after the completion of said interrupt sequence, with the effect that
   a delay following each instruction which is capable of generating an overflow is avoided unless an overflow condition actually exists by the concurrent implementation of the next instruction and detection of the occurence of an overflow.

8. The method as in claim 7 wherein said first signal is a flag signal to be stored n a register.

9. The method as in claim 8 wherein said step of inhibiting implementation of a next instruction comprises preventing a timing signal generated by a timing unit from triggering any changes in state within said computer.

10. The method as in claim 9 wherein said step of implementing said next instruction after the completion of said interrupt sequence comprises means for enabling an instruction counter which has been disabled by a signal produced in response to said flag signal.

11. The method of generating an ALU branch operation in a computer comprising the steps of:
   detecting a branch signal generated by an ALU operation indicating the initiation of a branch, and producing a first signal in response thereto;
   inhibiting implementation of a microinstruction, already begun but not yet executed, following said ALU operation thereby inhibiting any change in state within said computer following the generation of said branch signal, whereby said microinstruction is not inhibited if said first signal is not received;
   implementing an alterantive microinstruction following the receipt of said first signal; and
   implementing a selected sequence of microinstructions following the implentation of said alternative microinstruction, with the effect that
   a delay to test for a branch condition following each instruction which is capable of generating a branch is avoided unless a branch condition actually is generated by the concurrent implementation of said microinstruction following said ALU operation and detection of the occurence of a branch signal.

12. The method as in claim 11 wherein said step of detecting a branch signal generated by an ALU operation indicating the initiation of a branch, and producing a first signal in response thereto includes:
   initiating the implementation of a certain microinstruction following said ALU operation, said certain microinstruction being that microinstruction which is addressed when said ALU operation does not generated a branch signal.

* * * * *

UNITED STATES PATENT AND TRADEMARK OFFICE
CERTIFICATE OF CORRECTION

PATENT NO. : 4,811,211

DATED : 03/07/89

INVENTOR(S) : Leonardo Sandman, et al.

It is certified that error appears in the above-identified patent and that said Letters Patent is hereby corrected as shown below:

In Column 11, line 26, delete indirect "a".

Signed and Sealed this

Seventeenth Day of April, 1990

Attest:

HARRY F. MANBECK, JR.

Attesting Officer

Commissioner of Patents and Trademarks